United States Patent [19]

Snyder et al.

[11] 3,999,015
[45] Dec. 21, 1976

[54] AIRCRAFT MULTI-COMMUNICATIONS SYSTEM

[75] Inventors: Dennis G. Snyder, Dallastown; Eugene H. Paules, Red Lion, both of Pa.

[73] Assignee: Genie Electronics Co., Inc., Red Lion, Pa.

[22] Filed: May 27, 1975

[21] Appl. No.: 581,024

[52] U.S. Cl. .............................. 179/1 H; 340/27 R; 340/248 B; 179/1 VE
[51] Int. Cl.$^2$ ....................... G08B 3/10; G08B 1/08
[58] Field of Search ............ 179/1 VE, 1 VC, 1 H, 179/100.1; 340/22, 74, 27, 416

[56] References Cited

UNITED STATES PATENTS

| 2,873,073 | 2/1959 | Lekas | 179/1 VE |
| 3,581,014 | 8/1971 | Vogel | 340/27 R |
| 3,739,376 | 6/1973 | Keledy | 340/27 R |

*Primary Examiner*—Kathleen H. Claffy
*Assistant Examiner*—E. S. Matt Kemeny
*Attorney, Agent, or Firm*—Woodcock Washburn Kurtz & Mackiewicz

[57] ABSTRACT

An aircraft communication system adapted to provide a plurality of communication paths from respective inputs to a plurality of outputs, the communication paths being flexible in arrangement and operator control. For use in an aircraft, the system combines an intercom for voice transmission between pilot, co-pilot and passengers, along with channels for external radio reception and transmission by pilot and co-pilot. The system also provides enabling of transducer outputs only upon detection of input signals above a given threshold, and automatic monitoring of aircraft supply voltage conditions with visual and audio outputs. Specific features of the invention include: (a) audio source input circuits feed a common point which is connected to a threshold VOX switch circuit; (b) the VOX switch circuit controls a recorder, additional audio inputs, and a master amplifier circuit inputted from the common point and connectable to output transducers, whereby signals from the audio sources are outputted only when the common point signal exceeds the predetermined threshold; and (c) the audio source input circuits include aircraft power supply high and low detection circuitry.

10 Claims, 1 Drawing Figure

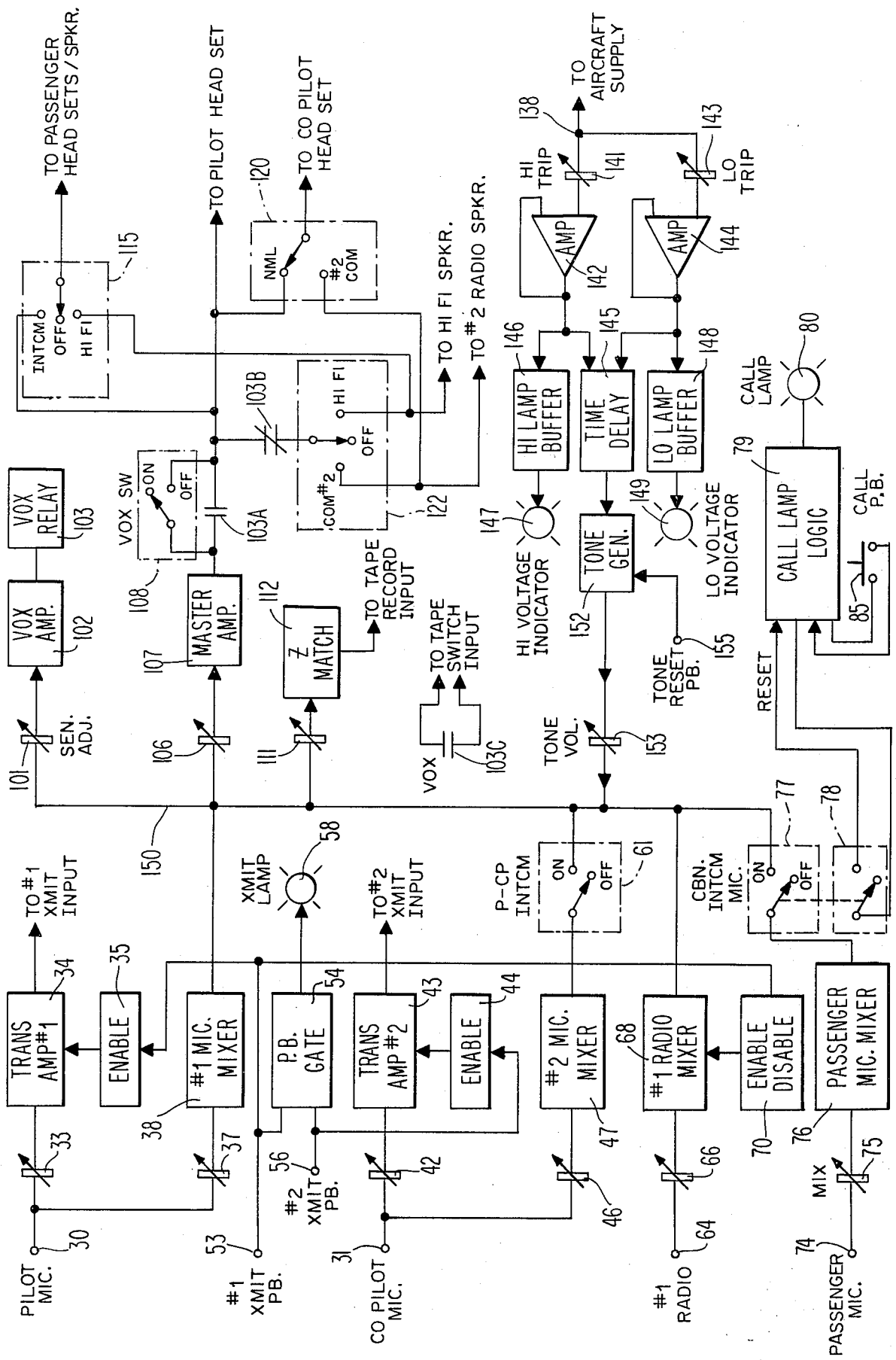

AIRCRAFT MULTI-COMMUNICATIONS SYSTEM

BACKGROUND OF THE INVENTION

1. Field of the Invention

This invention lies in the field of communication systems and, more particularly, combined intercom and radio systems for aircraft use.

2. Description of the Prior Art

Present day aircraft operation relies increasingly upon flexible radio communication systems, for communication with external locations, such as ground stations, and for internal communication, as between pilot and co-pilot, instructor and student, and pilot and passengers. A wide variety of radio system components are commercially available, as are intercom systems, and there is no problem in finding adequate components for desired aircraft radio/intercom systems. In fact, the problem is not in the availability of the desired radio components, but in the proper integration of all of the desired radio and intercom channels, so as to make available the desired flexibility of channels with a minimum number of operator controls. For example, there is a great need for efficient equipment for processing a plurality of microphone inputs so that they are available both for external radio transmission and intercom transmission, for processing received inputs for both pilot and intercom reception, and providing for efficient operation by pilot, co-pilot and passengers of the integrated system so as to make available the desired and intercom audio signals.

SUMMARY OF THE INVENTION

In view of the prior art needs as described hereinabove, there is provided an improved intercom system having multiple inputs and outputs, comprising a plurality of input paths for processing audio signals, threshold sensing circuitry for providing means for transmitting the audio signals on intercom only when they are above a predetermined threshold in signal strength, a main amplifier path operative in response to the threshold sensing means, and a plurality of output transducers with associated output transducer switching circuitry for switching the output of the amplifier path to respective ones of the output transducers. Secondary input sources are provided, with a secondary switching circuit, for switching secondary audio sources to the respective ones of the output transducers. In addition, there is provided an aircraft electrical supply processing path having means for analyzing the aircraft supply and providing both visual and audio signals when the supply is above or below predetermined respective limits.

The system combines an intercom for voice transmission between pilot, co-pilot and passengers or instructor and student.

The system also indicated visually when transmitting and thus warns of an inadvertent transmission caused by a stuck mike switch, etc.

The system provides automatic flight recording on any inexpensive cassette tape recorder with remote mike input. The tape operates by means of VOX only while the system is receiving or transmitting any messages or while pilots are communicating via intercom, and with no blank spots on tape between recordings. This provides automatic flight recording of all clearances, communications, etc. It also is a tremendous asset for flight instructing, as everything the instructor and student say is recorded on inexpensive cassettes, and the student can take the cassette home after a lesson and review it as often as desired.

By having a second radio receiver tuned to an emergency frequency 121.5 or 243.0 mh, any emergency radio message from any aircraft on the frequency is automatically recorded. Also, should a pilot desire to listen to a scheduled wheather broadcast at a time that he may be completely engrossed in some other pressing flying activity, the recorder automatically records the weather report, and the pilot can play it back any time he desires.

BRIEF DESCRIPTION OF THE DRAWING

The drawing shows a circuit diagram of the communications system of this invention.

DESCRIPTION OF THE PREFERRED EMBODIMENT

Referring now to the drawing, there is seen along the left hand side a series of inputs, namely the pilot microphone input 30, No. 1 transmit pushbutton 53, co-pilot microphone 31, No. 2 transmit pushbutton 56, No. 1 radio input 64, and the passenger microphone input 74. All of these inputs represent possible inputs to the multicom system of this invention, although it will be understood in relation to the subsequent description that a plurality of additional inputs can be integrated into the system.

The pilot microphone 30 is the microphone ordinarily used by the pilot in an aircraft situation, and the signal produced by it is an electrical signal representing the pilot voice communication. This signal is connected to volume control 33, which may be suitably be an adjustable tap resistor. The output of control 33 is connected to transmission amplifier No. 1, designated by the numeral 34, the output of which is shown as going to the No. 1 transmitter input. This signal is in condition for connection to the aircraft transmitter, for transmission to any externl location, such as a ground control tower. The pilot microphone signal is also connected through control circuit 37, the output of which is connected to the No. 1 microphone mixer 38, which provides an isolated output which is connected to common line 150. The mixer 38 provides transmission only forward to common line 150, and prevents transmission of other signals which reach line 150 back to the input of amplifier 34.

The input designated No. 1 XMIT PB 53 is the first transmit pushbutton, normally operated by the pilot on the aircraft example being illustrated. When this pushbutton is depressed suitable voltage is connected to the circuit at point 53 to enable the desired functions to be carried out. In the preferred embodiment of this invention, pressing this pushbutton places −12 volts DC at the input node. The pushbutton 53 is connected to the enable circuit 35, which enables amplifier 34; to the P.B. gate 54; and to the enable circuit 70 which enables the No. 1 radio mixer 68. The enable circuits may be any desired circuit configuration to interface with the amplifier and mixer respectively. In the preferred embodiment of this invention, the −12 VDC, when supplied through P.B. 53, enables transamp No. 1 by being connected through a current limiting resistor and diode to the base of a normally off transistor, thereby turning on the transistor and providing appropriate voltage to provide the transamp power supply. The −12 volts is likewise connected to an output circuit which biases an appropriate transistor in No. 1 radio mixer 68 to either conduct or not conduct, so as to enable or disenable that mixer, P.B. gate 54 comprises an OR gate which drives transmit lamp 58 whenever the −12 volt source is connected to one of its inputs.

The co-pilot microphone 31 and the No. 2 transmit pushbutton 56 are associated with circuitry similar to that of the pilot microphone and pushbutton inputs. Co-pilot microphone input 31 is connected through control circuit 42 to transmit amplifier No. 2 designated by the numeral 43, the output of which is available to go to the No. 2 transmitter input. Co-pilot microphone input 31 is also connected through control circuit 46 to No. 2 microphone mixer 47, which provides an output signal to line 150 and isolates amplifier 43 from other signals on line 150. The output of mixer 47 is connected through intercom switch 61, which may be operated by the pilot or co-pilot, to line 150. No. 2 transmit pushbutton 56 is also inputted to gate 54, which provides for energization of transmit lamp 58 when either the No. 1 or No. 2 pushbutton is closed. The No. 2 transmit pushbutton 56 may also be connected to enable circuit 44, for enabling amplifier 43. Enable circuits 35 and 44 are optional, and need not be used where it is not desired to enable the respective amplifiers only when the transmit button is pushed.

The No. 1 radio, as shown at 64, is a radio normally operated by the aircraft pilot. This input is connected through control circuit 66 to the No. 1 radio mixer 68, the output of which is connected to common line 150. As described hereinabove, mixer 68 is enabled through enable circuit 70 when the No. 1 transmit pushbutton is depressed. Thus, the signal from mixer 68 is placed on line 150 only when the pilot causes pushbutton 53 to be closed.

The passenger microphone 74 comprises a microphone input from the passenger microphone which is physically located in the aircraft cabin. The use of this is normally with private, business or military aircraft. In the case of airline aircraft the input would be from the stewardess input. This input is connected through control circuit 75 to the passenger microphone mixer 76, the output of which is connected through cabin intercom mike switch 77 to line 150. Thus, in order to operate the passenger microphone and make it available as an input to the system, this switch must be placed in the on condition. Cabin switch 77 is ganged with switch 78, which is connected to call lamp circuit 79. Also connected to call lamp circuit 79 is call pushbutton switch 85. The pushbutton is connected to circuit 79 so as to energize call lamp 80 when depressed, and ganged switch 78 is connected to call lamp circuit 79 so as to reset the circuit and make it available for a subsequent energization of the call lamp. Thus, when cabin switch 77 is placed in the on position, call lamp circuit 80 is reset so that the next time call pushbutton 85 is depressed, the call lamp is turned on. In practice, the arrangement is achieved by tying call lamp 80 and call pushbutton 85 in series between a predetermined supply voltage. A common terminal between the call lamp and the pushbutton is tied to the base of a first transistor, such that said first transistor is turned on when the pushbutton is depressed. The output of the first transistor is resistively connected to the base of a second transistor which is connected to the power supply so that it also is turned on whenever the first transistor is turned on. The second transistor is connected across the pushbutton, and has connected to its base a capacitor which provides electronic noise suppression to keep the circuit from turning on or off by external interference. This capacitor charges to a sufficient bias voltage to maintain the second transistor in conduction even when the pushbutton is again open, such that the call lamp stays on. The cabin intercom switch 77 is connected resistively from the base of the second transistor to one of the power supply terminals, such that when it is turned on it diverts base current, thus turning off the second transistor and the call lamp, leaving the circuit reset for the next depression of the call pushbutton. This circuit has been described in detail for illustrative purposes, but such details are not claimed, and thus no drawing is included.

Referring now to common line 150, any input appearing thereon is connected to three paths which, in the drawing, are seen proceeding flow-wise to the right from vertical line 150. The top path is the voice transmit (VOX) path. Line 150 is connected to a sensitivity adjustment circuit 101, which adjusts the threshold sensitivity of VOX amplifier 102. VOX amplifier 102 is of conventional design, and suitably has near its input an operational amplifier with a pair of input terminals, such that it produces an output when the difference input reaches a given threshold. By tying one of the inputs to a reference voltage, the VOX amplifier produces an output only when the audio signal on line 50 reaches a given input. Sensitivity adjustment circuit 101 may be a variable adjustment pot resistor, the output of which is connected to the variable input of the VOX operational amplifier. The output of the amplifier is connected to VOX relay 103, which relay is driven to an on state whenever an output is produced from the VOX amplifier. When no output is produced at the output of VOX amplifier, a timing circuit begins a delay, internally adjustable to 2–5 seconds. If no further output is produced by the VOX amplifier in this length of time the VOX relay is turned off. Should a signal be produced at the VOX amplifier during this time delay the timer is reset to T=0.

The second path, proceeding from top to bottom, and driven by a signal on line 150, is the master amplifier path. Volume control 106, suitably an adjustable pot, is connected to line 150, and provides an input to master amplifier 107. The output of amplifier 107 is connected through normally open VOX contacts 103A, operated by VOX relay 103. When the VOX relay is driven by an output from the VOX amplifier, these contacts close, providing a conductive path through to the pilot headset. The VOX path may be effectively taken out of operation by switching the VOX bypass switch 108 from on to off. However, when this switch is in the on position, a signal is transmitted through to the pilot headset only when the signal on line 150 is of sufficient strength to drive VOX relay 103 and close contacts 103A.

Switch 115, which has its output connected to the passenger headsets and/or speakers, has a first input terminal, designated intercom, which is connected to the output of VOX contacts 103A. A second input terminal of passenger switch 115 is connected to a secondary input, contained within secondary switch 122, which secondary input is designated HI FI. Thus, when a passenger elects to listen to HI FI music, the pilot simply switches switch 115 to HI FI, and thereby is connected directly to the HI FI output, regardless of the operation of the intercom system by the pilot and co-pilot.

The co-pilot headset is connected to co-pilot selector switch 120. The normal input terminal of switch 120 is connected to the same terminal as connected to the pilot headset, such that when the co-pilot switch is on normal the co-pilot hears the same thing as the pilot. However, the co-pilot can also place switch 120 on the terminal designated as "No. 2 COM", which is connected directly to the output terminal of communication radio No. 2, whereby the co-pilot hears anything coming in over the No. 2 communication radio. Note that the COM No. 2 and HI FI terminals are also directly connected to the No. 2 radio speaker and the HI FI speaker respectively, which can be listened to by the passengers or pilots whenever not wearing their headsets. The output of secondary switch 122 is connected through normally closed VOX contacts 103B to the pilot headset. Thus, when there is no signal on line 150 of sufficient strength to drive the VOX relay, the pilot and/or co-pilot can listen to either the No. 2 radio or the HI FI by appropriate setting of secondary switch 122. However, as soon as the VOX relay is driven, contacts 103B open, such that only the output of the master amplifier is connected through to the pilot headset or the co-pilot headset.

The third path driven by line 150 is to the tape recorder (not shown). Attenuator circuit 111 is connected to line 150, and provides an output into impedance matching circuit 112, the output of which drives the tape recorder. When VOX relay 103 is driven, contacts 103C close, providing a closed circuit to the tape switch input, thereby running the tape recorder only when the requisite signal strength is detected on line 150.

Referring to the lowest path connected to the line 150 in the drawing, there is seen an aircraft supply voltage monitoring path which proceeds from right to left. The aircraft supply voltage is connected at node 138 to high voltage threshold (trip) circuit 141 and low voltage threshold (trip) circuit 143. Each of these circuits may suitably be a voltage divider connected between the supply voltage and ground, providing as an output a given fraction of the supply voltage. The outputs of threshold circuits 141 and 143 are inputted to differential amplifiers 142 and 144 respectively, which provide a change of state at the output when the input goes above and below the respective reference inputs to the amplifiers. The output of high amplifier 142 is connected to high lamp buffer circuit 146, which drives high voltage indicator lamp 147, thereby providing a visual indication when the aircraft supply voltage has exceeded the predetermined threshold. Likewise, the output of low amplifier 144 is connected through low lamp buffer circuit 148 to the low voltage indicator, thereby providing visual indication of low voltage when it occurs. The outputs of each of the amplifiers 142 and 144 are inputted to a time delay circuit 145, which provides an output signal delayed by an appropriate time period, for example, 4 to 8 seconds. The reason for introducing such a delay is to avoid producing an audio alarm signal as the result of simply transient signals, and to only produce an output alarm signal when the aircraft voltage has been too high or too low for a predetermined period of time. The output of time delay circuit 145 is connected to tone generator 152, preferably a unijunction oscillator, which produces an audio output which is connected through volume control circuit 153 to line 150. Once triggered by the output of time delay circuit 145, tone generator 152 runs until reset through tone reset pushbutton 155, after which it is in condition to immediately oscillate again as soon as the next output is received from the time delay circuit. The tone generator output, appropriately adjusted in volume at tone control circuit 153, is then processed by the VOX, master amp, and tape recorder paths in the same manner as described hereinabove.

An advantage of the low voltage monitor is to be recognized in the case where there should be a generator failure. In such case, the pilot would have no warning until failure of all radio equipment from resulting low battery voltage. Being warned immediately at the loss of generator capability, the pilot can switch off all unnecessary electrical equipment, excepting of course communications with air traffic control. With today's solid state communications equipment, the aircraft battery can supply power for several hours of operation, permitting a safe landing even when flying under instrument flight rules. Conversely, should a voltage regulator stick, or otherwise become inoperative, so as to produce an overvoltage to the battery, causing it to burn up and cause complete electrical system loss, the overvoltage circuit warns the pilot. In this case, the pilot simply turns the aircraft generator switch off until receiving the under voltage signal, and then turns it on again. This technique permits safe completion of the flight.

In operation, the system of this invention provides a highly flexible communication system for aircraft operation, which provides the pilot, the co-pilot and the passengers with a flexible intercom system, while also providing the pilot and co-pilot with simultaneous transmission and receiving capability. It is to be noted that the pilot can talk on his transmitter at any time that the transmit pushbutton is depressed, and the co-pilot has the same capability. When, and only when the signal from one of the microphone inputs or the radio is sufficient to drive the VOX relay, will there be communication through to the pilots and the passengers over the intercom, such that most spurious signals and noise are eliminated, thereby vastly decreasing the noise to which the pilots and passengers are subjected. At the same time, the master amplifier path is always live, and by adjustment of the VOX bypass switch, the threshold feature can be taken out of operation. Likewise, all inputs are always available to the tape recorder, but the system provides the capability of running the tape only when such inputs exceed the predetermined threshold value.

When the co-pilot places the selector switch on normal, and the VOX bypass switch is off, he will hear anything that passes through the master amplifier and is strong enough to drive the VOX relay. For the same switch conditions, when the VOX relay is not driven and the secondary switch is in the off position, there will be no input through to the pilot or the co-pilot headset. However, if the secondary input is set to HI FI and the VOX relay is not driven, regardless of the VOX bypass switch setting the HI FI signal is placed on the pilot headset. If the secondary switch is set to COM NO. 2 and the VOX relay is not driven, with the selector switch on normal, the COM NO. 2 signal will appear on both the pilot and co-pilot headsets.

One of the primary advantages of this arrangement is to permit the pilot to listen to weather broadcasts, airport traffic information service, etc., and simultaneously always to be in primary contact with air traffic control. At any time a communication is received from airway traffic control the VOX automatically switches to traffic control communication and then automatically returns to secondary communication at the termination of communication with traffic control.

In the ordinary prior art operating methods, without this system, a pilot must first get permission to leave ATC (airway traffic control) frequency. Should an emergency situation come up while the pilot is on another frequency ATC is unable to contact the pilot. Also, many times a pilot may forget to change back to ATC and thus be out of contact for long periods.

It is understood that various changes in the details and arrangement of the component parts of the invention as herein described and illustrated, may be made by those skilled in the art within the principle and scope of the invention as expressed in the following claims.

We claim:
1. Communications apparatus for use in an aircraft, comprising:
   a. a plurality of input paths, adapted to receive respective electrical input signals, said input paths having outputs connected at a common connection point;
   b. threshold sensing means, connected to said common connection, for sensing when the signal at said common connection point is above a predetermined threshold level;
   c. a common amplifier path, having an input connected to said common connection point, and including threshold switching means operatively responsive to said threshold sensing means, said path having an output at which is delivered an amplified signal representative of the signal provided at said common connection point as a function of the operation of said threshold sensing means;
   d. a plurality of output transducers;
   e. transducer switching means, connected to said amplifier output, for switchably connecting said output to respective ones of said output transducers; and
   f. secondary switching means, including a switch responsive to said threshold switching means, and connected to said amplifier output, for switchably connecting secondary audio sources to said output transducers through said transducer switching means.

2. The communications apparatus as described in claim 1, comprising aircraft supply voltage processing means, having an input adapted to be connected to the aircraft voltage supply, for generating signals representative of the state of said aircraft supply voltage, and having an output at which said representative signal appears, which output is connected to said common connection point.

3. The apparatus as described in claim 2, wherein said threshold sensing means comprises amplifier means for amplifying the signal appearing at said common connection point, and a relay circuit driven by the output of said amplifier means, which relay circuit has a plurality of contacts which change positions as a function of the strength of the signal at said common connection point relative to said predetermined threshold.

4. The apparatus as described in claim 3, wherein said amplifier path contains normally open contacts which are controlled by said relay, said amplifier path further comprising a switch across said contacts to provide operator control over the effect of said threshold sensing means on said amplifier path.

5. The apparatus as described in claim 4, wherein said aircraft supply processing means comprises high voltage amplifier means for providing a signal when said aircraft supply exceeds a predetermined high voltage level, and low voltage amplifier means for providing an output signal when said aircraft supply voltage is below a predetermined voltage level.

6. The apparatus as described in claim 5, wherein said voltage processing means comprises a time delay circuit, said time delay circuit having inputs connected to said high voltage amplifier means and low voltage amplifier means respectively, said voltage processing means also including an audio generator driven by said time delay means, for providing an audio output signal upon the occurrence of an aircraft supply voltage exceeding either said predetermined high voltage or said predetermined low voltage for a predetermined time period.

7. The apparatus as described in claim 1, comprising at least two microphones connected to respective ones of said input paths, and further comprising transmit amplifiers connected to respective ones of said at least two microphones for amplifying said microphone output signals.

8. The apparatus as described in claim 7, comprising at least two switches corresponding to said at least two microphones, said switches being manually operable, and enabling means connected between respective corresponding switches and transmit amplifiers for enabling operation of said transmit amplifiers as a function of the operation of said switches.

9. The communication apparatus as described in claim 1, having means for automatic flight recording connected to said common connection point.

10. Communications apparatus for use in an aircraft, comprising:
   a. a plurality of input paths, adapted to receive respective electrical input signals, said input paths having outputs connected at a common connection point and each having a mixer element with the output of said each mixer connected to said common point;
   b. common threshold sensing means connected to said common connection point, for sensing when the signal at said common connection point is above a predetermined threshold level;
   c. a master amplifier path having an input connected to said common connection point and including threshold switching means operatively responsive to said threshold sensing means, said threshold switching means including a two state element whereby signal transmission through said master path is passed when said element is in a first state and blocked when said element is in a second state, said path having an output at which is delivered, when said element permits signal passage, an amplified signal representative of the signal at said common connection point;
   d. a plurality of output transducers;
   e. transducer switching means, connected to said master amplifier path output, for switchably connecting said output to respective ones of said output transducers;
   f. secondary switching means, including a switch responsive to said threshold switching means, and connected to said amplifier output, for switchably connecting secondary audio sources to said output transducers through said transducer switching means; and g. aircraft supply voltage processing means, for generating signals representative of the state of said aircraft supply voltage, said processing means having threshold means for producing a signal in excess of the threshold level of said common threshold sensing means when the aircraft supply is not within a predetermined range.

* * * * *